May 10, 1960   B. MEKSULA   2,936,066
PORTABLE CONTAINER FOR FISHING TACKLE AND OTHER USES
Filed Aug. 29, 1958   2 Sheets-Sheet 2

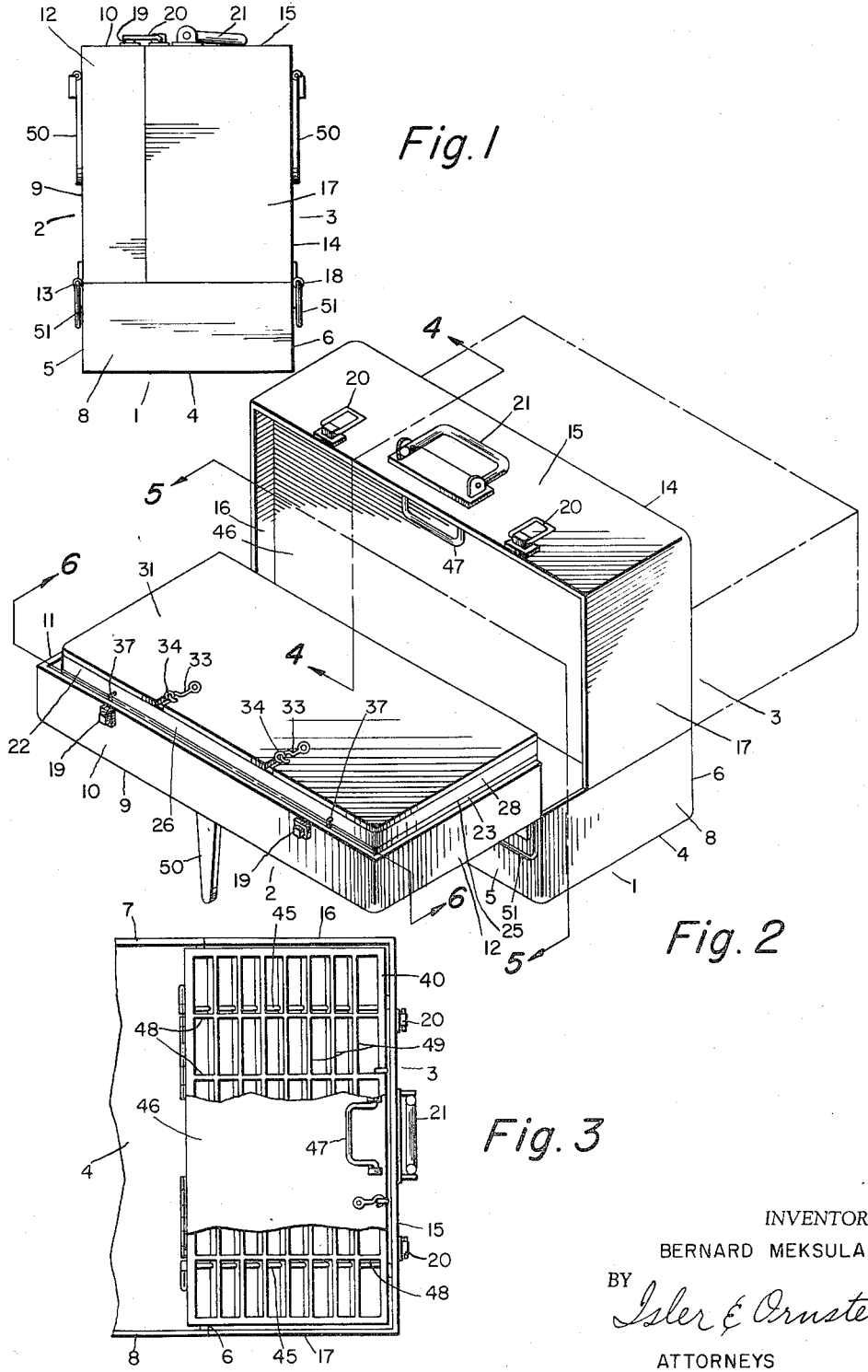

INVENTOR.
BERNARD MEKSULA
BY Isler & Ornstein
ATTORNEYS

United States Patent Office 2,936,066
Patented May 10, 1960

2,936,066

PORTABLE CONTAINER FOR FISHING TACKLE AND OTHER USES

Bernard Meksula, Cleveland, Ohio

Application August 29, 1958, Serial No. 758,036

6 Claims. (Cl. 206—16)

This invention relates generally to portable containers, but has reference more particularly to a container designed especially for use in carrying fishing tackle and the like.

A primary object of the invention is to provide a portable container of the character described, embodying a unique arrangement of trays and locking means for such trays.

Another object of the invention is to provide a portable container, in which access to any desired tray may be had quickly and easily, and without disturbing the contents of the other trays.

A further object of the invention is to provide a container of the character described, in which the trays are provided with compartments having walls slanted or inclined to receive baits in a manner which avoids injury or damage to the baits.

Other objects and advantages of my invention will be apparent during the course of the following description.

In the accompanying drawings forming a part of this specification, and in which like numerals are employed to designate like parts throughout the same, Fig. 1 is a front or end elevational view of the container, in closed condition;

Fig. 2 is a perspective view of the container, with one cover thereof in open condition, and showing, in broken lines, the other cover of the container, in open condition;

Fig. 3 is a plan view of the right cover of the container, in open condition, with portions of the tray lid broken away to show certain features of the construction;

Figure 4:
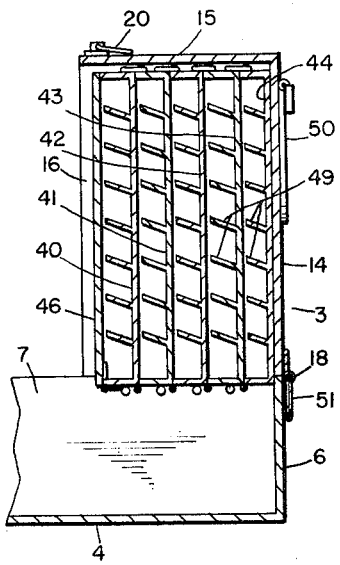
Fig. 4 is a fragmentary cross-sectional view, taken on the line 4—4 of Fig. 2.

Referring more particularly to the drawings, the container will be seen to comprise a body generally designated by reference numeral 1 and covers generally designated by reference numerals 2 and 3, one of which is narrower than the other, as clearly shown in Figs. 1 and 2.

The body 1 is of rectangular box-like form, and comprises a bottom 4, sides 5 and 6 and ends 7 and 8.

Figure 7:
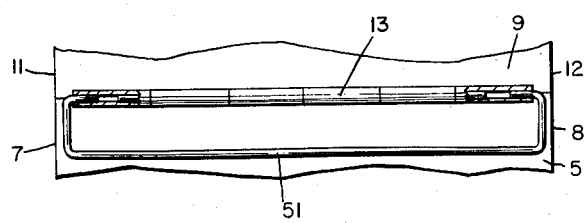
Fig. 7 is a fragmentary view, showing the bait rack.

The cover 2 is of similar rectangular form, and comprises a side wall 9, top 10, and ends 11 and 12, the lower edge of the wall 9 being hingedly secured to the upper edge of the side 5 of the body, as by means of a piano-type hinge 13, as best shown in Fig. 7.

The cover 3 is of similar rectangular form, and comprises a side wall 14, top 15, and ends 16 and 17, the lower edge of the wall 14 being hingedly secured to the upper edge of the side 6 of the body, as by means of a piano-type hinge 18, as best shown in Figs. 1 and 4.

In the closed condition of the container, as shown in Fig. 1, the body 1 and covers 2 and 3 coact to form a closed hollow container, which, when the covers 2 and 3 are latched or locked together, by means of coacting latch parts 19 and 20, secured respectively to the covers 2 and 3, may be carried or transported by means of a handle 21, which is pivotally secured to the top 15 of the cover 3.

Figure 5:
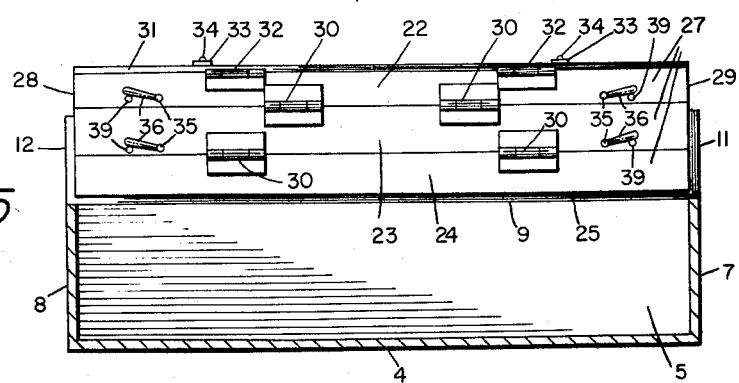
Fig. 5 is a cross-sectional view, taken on the line 5—5 of Fig. 2.
Figure 6:
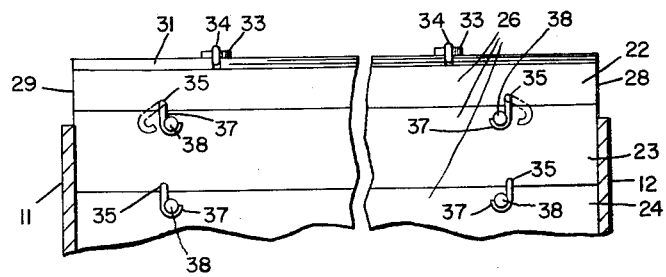
Fig. 6 is a fragmentary cross-sectional view, taken on the line 6—6 of Fig. 2.

Disposed within the cover 2, as best shown in Figs. 2, 5 and 6, is a tier of trays 22, 23 and 24, superimposed upon each other and each tray having a bottom 25, sides 26 and 27, and ends 28 and 29, and being open at the top. Each tray is preferably molded as a single piece of plastic. The bottom 25 of the tray 24 is secured to the wall 9 of the cover 2, as by screws, or other means (not shown) and the sides 27 of the trays are hingedly secured to each other, as by means of hinges 30 (Fig. 5).

A lid 31 is provided for closing the upper tray 22, and this lid is hinged to the side 27 of the tray 22, as by hinges 32 (Fig. 5). The lid may be fastened in closed position by means of hooks 33, which engage eyes 34 extending from the tray 22 (Figs. 2, 5 and 6).

Means have also been provided for locking the trays to each other at all times when access to the trays is not desired. Such means comprises rods 35 extending transversely through the trays adjacent the bottoms thereof, and mounted for rotation in the sides 26 and 27 of the trays. Each rod is provided at the end thereof adjacent the side 27 of the tray with a handle or lever 36 (Fig. 5), by means of which the rods may be rocked about its axis, and is provided at the end thereof adjacent the side 26 of the tray with a hook 37 (Fig. 6) engageable with a pin 38 extending from the side 26 of the tray immediately therebelow. When the levers 36 are disposed against stop pins 39 extending from the sides 27, the hooks 37 are engaged with the pins 38, as shown in solid lines in Figs. 5 and 6. When access to any drawer is desired, the rod 35 above that tray is rotated to disengage the hook, from the pin 38 of the tray to which access is desired, as indicated by the broken lines in Fig. 6, after which the tray may be lifted and access had to the desired tray.

Disposed within the cover 3, as best shown in Figs. 2, 3 and 4, is a tier of trays 40, 41, 42, 43 and 44, of a construction identical with the trays 22, 23 and 24, so that further description of these trays is unnecessary. These trays are hingedly secured to each other in the same manner as are the trays 22, 23 and 24, and the bottom tray is secured, as by screws or other means (not shown) to the wall 14 of the cover 3. Moreover, rods 45 (Fig. 3) are provided, similar to the rods 35 for locking the trays to each other, these rods having levers and hooks similar to the levers 36 and hooks 37. Pins similar to the pins 38 and 39, are also provided. A lid 46 is also provided for the tray 40, which lid may be fastened to the tray as by means of hooks and eyes similar to the hooks 33 and eyes 34. Since the lid 46 is recessed in the cover 3, a handle 47 (Figs. 2 and 3) is secured to the lid for facilitating opening of this lid.

The trays 40 to 44 inclusive, as are the trays 22, 23 and 24, are provided with transverse partitions 48 and longitudinal partitions 49, forming dividers, which provide compartments for the reception of individual baits or other fishing tackle. The dividers 49 are slanted or inclined in the manner shown in Figs. 3 and 4. This is of advantage, in connection with bait, since, when the container is being carried, the bait will have a tendency to move to the bottom of the compartments, and wires, hooks and other parts of the baits will not be injured due to pressure thereagainst by the bottom of the superimposed tray.

When access to the trays is desired, one or both of the covers 2 and 3 is disposed in a horizontal position, as shown in Fig. 2, the cover being supported in such position, as by means of a leg or strut 50, one of which is pivotally secured to each of the covers 2 and 3, and which is movable to a vertical position, as shown in Fig. 2. When not in use, the strut lies flat against the cover, as in Fig. 1.

I have also provided bars or racks 51, which, as best shown in Fig. 7, are pivotally secured to the ends of the hinges 13 and 18. These bars or racks may be utilized for hanging the baits when they are to be dried, or may be used for other purposes.

It is thus seen that I have provided a portable container which is extremely useful for fishing tackle, and is highly advantageous for this purpose in that access to any desired tray may be had quickly and easily without disturbing the other trays or the contents thereof.

When the container is being transported, all of the trays are locked to each other, and the lids are locked to the uppermost trays in each cover, so that there is no danger of the contents of the trays being dislodged or damaged. Moreover, each of the covers 2 and 3 contains a sufficient number of trays, which may be of different depths, so that all of the space between the walls 9 and 14 is completely filled with trays when the container is closed. Since the lid 31 and the tray 22 projects into the cover 3 when the container is closed, the tray 22 helps to prevent displacement as between the covers 2 and 3, in a plane parallel with these covers.

The body 1 of the container may be utilized for fishing tackle other than bait, or for other supplies which are usually carried by fishermen.

It is to be understood that the form of my invention, herewith shown and described, is to be taken as a preferred example of the same, and that various changes may be made in the shape, size and arrangement of parts of my invention, without departing from the spirit of the invention or the scope of the subjoined claims.

Having thus described my invention, I claim:

1. In a portable container of the character described, a body of rectangular box-like form comprising a bottom, sides and ends, a rectangular cover hingedly secured to the upper edge of each of said sides, each cover comprising a side wall, a top and ends, said covers movable to a closed position in which the covers meet along a plane substantially perpendicular to said bottom, and to an open position, in which the side wall of the cover extends substantially parallel with said bottom, a tier of trays mounted in each cover with the bottom tray of each tier rigidly secured to the side wall of the cover, each tier of trays substantially filling the cover in which it is mounted, each of the trays in each tier being pivotally secured to the underlying tray along an edge which is remote from the top of the cover in which the tier is mounted, whereby each tray may be opened by lifting the edge thereof opposite said first-named edge, and means for locking each tray to its underlying tray, said locking means comprising an element extending transversely through the tray adjacent the bottom of the tray, a keeper element secured to the side of the tray immediately therebelow but adjacent the top of the cover, and means for manipulating said first-named element to release it from said keeper element, said manipulating means being disposed at the side of the tray which is remote from the top of the cover.

2. A portable container, as defined in claim 1, in which said first-named element of the locking means is a rod mounted for rotation in the sides of the tray and provided at one end with a hook, the keeper element is a pin with which said hook engages, and said manipulating means is a lever secured to the other end of the rod.

3. A portable container, as defined in claim 1, in which each tray has a flat bottom and is provided with transverse partitions and longitudinal partitions which are parallel with each other, said longitudinal partitions being inclined to said bottom.

4. A portable container, as defined in claim 1, including a rectangular lid for closing the uppermost tray of each tier, each lid being pivoted to said uppermost tray at an edge thereof remote from said top of the cover.

5. A portable container, as defined in claim 4, including means for fastening said lid to said uppermost tray, said fastening means disposed at the edge of the lid adjacent said top of the cover.

6. In a portable container of the character described, a body of rectangular box-like form comprising a bottom, sides and ends, a rectangular cover hingedly secured to the upper edge of each of said sides, each cover comprising a side wall, a top and ends, said covers movable to a closed position in which the covers meet along a plane substantially perpendicular to said bottom, and to an open position in which the top of the cover extends substantially parallel with said bottom, a tier of trays mounted in each cover, with the bottom tray in each tier rigidly secured to the side wall of the cover, each tier of trays substantially filling the cover in which it is mounted.

References Cited in the file of this patent

UNITED STATES PATENTS

| 1,190,758 | Hand | July 11, 1916 |
| 1,653,711 | Labadie et al. | Dec. 27, 1927 |
| 2,539,302 | Fye | Jan. 23, 1951 |
| 2,683,642 | Stoleson | July 13, 1954 |

FOREIGN PATENTS

| 764,061 | Great Britain | Dec. 19, 1956 |